(12) United States Patent
Yazdani (10) Patent No.: US 9,924,323 B2
(45) Date of Patent: Mar. 20, 2018

(54) APPARATUS AND METHOD FOR FACILITATING RETURN OF A MOBILE DEVICE

(71) Applicant: Futurewei Technologies, Inc., Plano, TX (US)

(72) Inventor: Reza Yazdani, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/242,388

(22) Filed: Aug. 19, 2016

(65) Prior Publication Data

US 2018/0054708 A1 Feb. 22, 2018

(51) Int. Cl.
| | |
|---|---|
| *H04W 4/02* | (2009.01) |
| *H04W 4/14* | (2009.01) |
| *H04L 29/08* | (2006.01) |
| *H04W 88/08* | (2009.01) |
| *H04W 88/02* | (2009.01) |

(52) U.S. Cl.
CPC ............ *H04W 4/025* (2013.01); *H04L 67/18* (2013.01); *H04L 67/26* (2013.01); *H04W 4/14* (2013.01); *H04W 88/02* (2013.01); *H04W 88/08* (2013.01)

(58) Field of Classification Search
CPC ....... H04W 4/025; H04W 4/14; H04W 88/08; H04W 88/02; H04L 67/18; H04L 67/26
See application file for complete search history.

(56) References Cited

U.S. PATENT DOCUMENTS

| | | | |
|---|---|---|---|
| 8,634,808 B1 | 1/2014 | Zhong et al. | |
| 2006/0274683 A1* | 12/2006 | Koch | H04W 28/14 370/310.2 |
| 2007/0105528 A1* | 5/2007 | Haas | H04W 4/22 455/404.1 |
| 2010/0003950 A1* | 1/2010 | Ray | G10L 13/043 455/404.1 |
| 2010/0273452 A1* | 10/2010 | Rajann | H04W 8/22 455/411 |
| 2013/0040611 A1 | 2/2013 | Rega et al. | |

(Continued)

FOREIGN PATENT DOCUMENTS

| | | |
|---|---|---|
| CN | 200952942 Y | 9/2007 |
| CN | 101162153 A | 4/2008 |

(Continued)

OTHER PUBLICATIONS

Reza Yazdani, U.S. Appl. No. 15/242,397, filed Aug. 19, 2016.

(Continued)

*Primary Examiner* — Brandon J Miller
(74) *Attorney, Agent, or Firm* — Zilka-Kotab, PC (57) ABSTRACT

An apparatus and method are provided to facilitate a return of a mobile device to an owner. A graphical user interface element is displayed, utilizing a display of a mobile device. A user input is detected in connection with the graphical user interface element, utilizing an input device of the mobile device. An interface is displayed including at least one return option for returning the mobile device to an owner of the mobile device, utilizing the display of the mobile device. Such interface is displayed in response to the detection of the user input in connection with the graphical user interface element utilizing the input device of the mobile device.

21 Claims, 6 Drawing Sheets

(56) References Cited

U.S. PATENT DOCUMENTS

| | | | |
|---|---|---|---|
| 2014/0075220 A1* | 3/2014 | Song | H04W 52/0277 |
| | | | 713/320 |
| 2014/0274121 A1 | 9/2014 | Raniere | |
| 2014/0329460 A1* | 11/2014 | Loutit | G06Q 40/08 |
| | | | 455/39 |
| 2015/0207917 A1 | 7/2015 | Yang et al. | |
| 2016/0127531 A1 | 5/2016 | Halls | |
| 2016/0286035 A1* | 9/2016 | Childress | H04W 4/021 |

FOREIGN PATENT DOCUMENTS

| | | | |
|---|---|---|---|
| CN | 101187563 A | | 5/2008 |
| CN | 101266151 A | | 9/2008 |
| CN | 102147257 A | | 8/2011 |
| CN | 104408633 A | | 3/2015 |
| CN | 204377003 U | | 6/2015 |
| CN | 105162889 A | | 12/2015 |

OTHER PUBLICATIONS

Non-Final Office Action from U.S. Appl. No. 15/242,397, dated Feb. 27, 2017.
International Search Report for PCT Application No. PCT/CN2017/097518, dated Nov. 16, 2017.
International Search Report for PCT Application No. PCT/CN2017/097519, dated Oct. 19, 2017.

\* cited by examiner

APPARATUS AND METHOD FOR FACILITATING RETURN OF A MOBILE DEVICE

FIELD OF THE INVENTION

The present invention relates to mobile devices, and more particularly to systems for returning a mobile device to an owner.

BACKGROUND

Current mobile devices and systems that support the same have a capability of locating a mobile device when lost. This is typically accomplished by the system receiving global positioning system (GPS) information (e.g. a device location, etc.) from the mobile device, and an owner of the mobile device logging into the system using a different device (e.g. a computer, another device, etc.), so as to view such GPS information. One challenge with such frameworks is that they rely on communication between the lost mobile device and the central system. Such communication, however, is subject to failure due to a variety of factors (e.g. lack of mobile device power, lack of cellular service, etc.).

Another challenge may involve a precision with which the location of the mobile device is provided. In some cases, the aforementioned GPS may not necessarily be accurate enough to be helpful (e.g. by only identifying a general area where the mobile device was last located, etc.). With that said, even if the mobile device communication capabilities are intact and the identified location exhibits sufficient precision, there may be situations, particularly involving long distance travel (e.g. international travel, etc.) where, even if the owner knows the location of the mobile device, there is no reasonable way of retrieving it.

SUMMARY

An apparatus and method are provided to facilitate a return of a mobile device to an owner. A graphical user interface element is displayed, utilizing a display of a mobile device. A user input is detected in connection with the graphical user interface element, utilizing an input device of the mobile device. An interface is displayed including at least one return option for returning the mobile device to an owner of the mobile device, utilizing the display of the mobile device. Such interface is displayed in response to the detection of the user input in connection with the graphical user interface element utilizing the input device of the mobile device.

In a first embodiment, the graphical user interface element may be displayed via a lock screen of the mobile device.

In a second embodiment (which may or may not be combined with the first embodiment), a code that is received over a network may be identified. Further, the interface including the at least one return option may be displayed, in response to the receipt of the code.

In a third embodiment (which may or may not be combined with the first and/or second embodiments), the code may include a textual code predefined by the owner.

In a fourth embodiment (which may or may not be combined with the first, second, and/or third embodiments), a sound may be emitted utilizing an output device of the mobile device for drawing attention to the mobile device, in response to the receipt of the code.

In a fifth embodiment (which may or may not be combined with the first, second, third, and/or fourth embodiments), it may be determined whether at least one of a plurality of conditions is met in connection with the mobile device. Further, the interface including the at least one return option may be displayed, in response to the determination that the at least one condition is met in connection with the mobile device. Optionally, the at least one condition may involve at least one of a power level of the mobile device, a movement of the mobile device, or a lapse of a predetermined amount of time. Further, a sound (e.g. a voice, siren, etc.) may be emitted utilizing an output device of the mobile device for drawing attention to the mobile device, in response to the determination that the at least one condition is met in connection with the mobile device.

In a sixth embodiment (which may or may not be combined with the first, second, third, fourth, and/or fifth embodiments), the location of the mobile device may be identified, utilizing a global positioning system of the mobile device. Further, at least one language may be selected, based on the location. The at least one return option for returning the mobile device to the owner may thus be presented (e.g. visually, audibly, etc.) in the selected at least one language.

In a seventh embodiment (which may or may not be combined with the first, second, third, fourth, fifth, and/or sixth embodiments), a message may be sent to the owner in connection with the interface being displayed, utilizing a network interface of the mobile device. Optionally, a location of the mobile device may be identified, utilizing a global positioning system of the mobile device, so that such location may be included with the message. Optionally, the message may include an identifier associated with the mobile device.

In an eighth embodiment (which may or may not be combined with the first, second, third, fourth, fifth, sixth, and/or seventh embodiments), the at least one return option for returning the mobile device to the owner, may include a communication option for communicating with the owner. In such embodiment, user input may be detected in connection with the communication option. A communication interface may be displayed that is configured for creating a message. Such communication interface may be displayed in response to the detection of the user input in connection with the communication option. The message may be sent to the owner, utilizing a network interface of the mobile device. Optionally, the communication interface may conceal an identity of the owner.

In a ninth embodiment (which may or may not be combined with the first, second, third, fourth, fifth, sixth, seventh, and/or eighth embodiments), the at least one return option for returning the mobile device to the owner, may include at least one of: a communication option for communicating with the owner, a pickup option for arranging the mobile device to be picked up by the owner, a contact option for providing contact information to the owner, a mail option for returning the mobile device to the owner by mail, and/or a surrender option for surrendering the mobile device to a public authority.

In a tenth embodiment (which may or may not be combined with the first, second, third, fourth, fifth, sixth, seventh, eighth, and/or ninth embodiments), a power level of the mobile device may be detected. Further, it may be determined whether the power level of the mobile device falls below a predetermined minimum power threshold. Use of a power supply may be restricted to the display of the interface including the at least one return option for returning the mobile device to the owner of the mobile device, if it is determined that the power level of the mobile device falls below the predetermined minimum power threshold. Optionally, an auxiliary power source may be utilized for the display of the interface including the at least one return option for returning the mobile device to the owner of the mobile device, if it is determined that the power level of the mobile device falls below the predetermined minimum power threshold.

To this end, in some optional embodiments, one or more of the foregoing features of the aforementioned apparatus and/or method may facilitate the return of a lost mobile device. Such features may be particularly helpful when conventional device locating systems that rely on mobile device communication capabilities fail (e.g. due to a lack of mobile device power, a lack of cellular service, etc.), or exhibit insufficient locating precision. Further, even if communication is intact and locating precision sufficient, the aforementioned features may be particularly beneficial in situations involving long distance travel (e.g. international travel, etc.) where, even if the owner knows the location of the mobile device, there is no reasonable way of retrieving it. In such case, the mobile device may be more easily located by third parties and be further equipped with features to enable/facilitate the return of the device to the owner by such third parties. This may, in turn, result in significant cost savings (by avoiding a need to replace the mobile device) as well as convenience that would otherwise be foregone in systems that lack such capabilities. It should be noted that the aforementioned potential advantages are set forth for illustrative purposes only and should not be construed as limiting in any manner.

DETAILED DESCRIPTION

Figure 1:
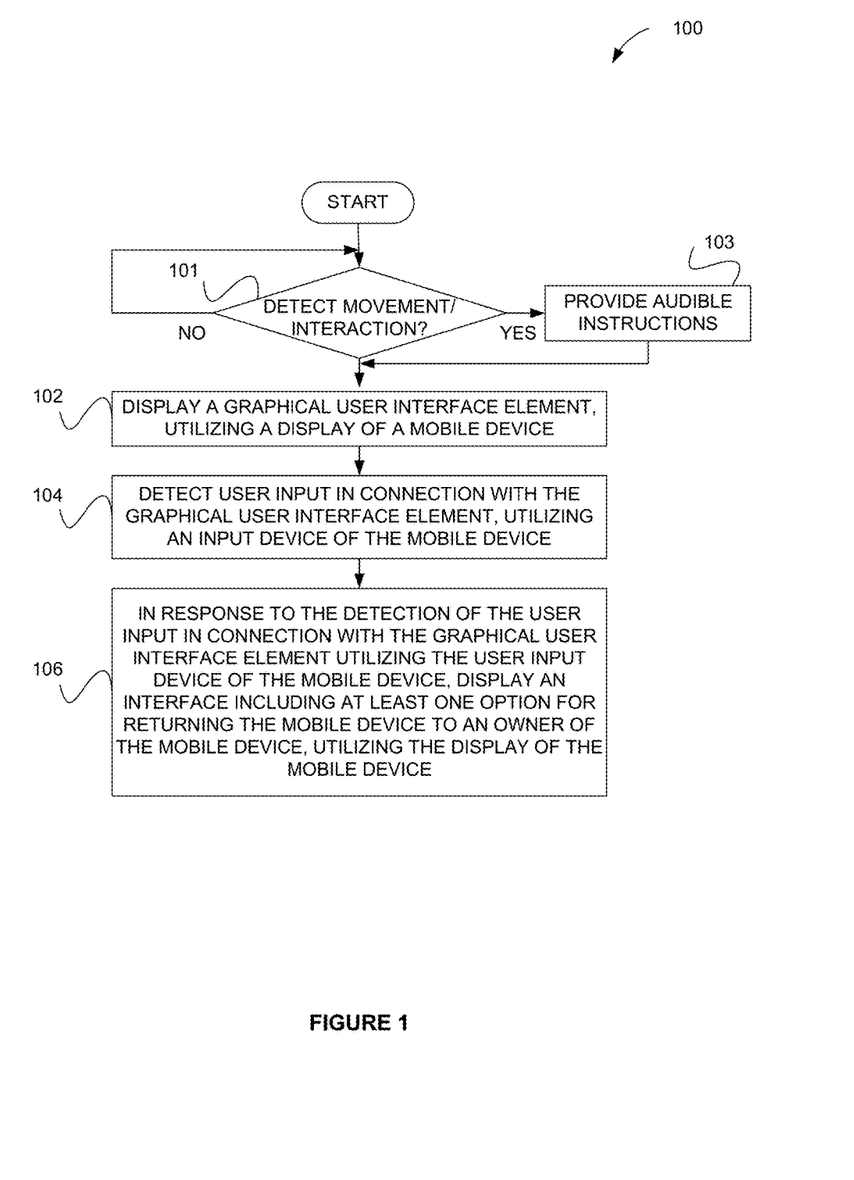
FIG. 1 is a flowchart of a method for facilitating a return of a mobile device to an owner, in accordance with one embodiment.

FIG. 1 is a flowchart 100 of a method for facilitating a return of a mobile device to an owner, in accordance with one embodiment. In the context of the present description, such mobile device may include any mobile electronic device configured for wirelessly communicating with a cell or access point (AP) in a cellular or mobile communication system. Non-limiting examples of the mobile device may include a user equipment (UE), personal digital assistant (PDA), iPAD™, tablet, mobile terminal, phone, smartphone, laptop, notepad, and/or and any other type of wireless device that meets the above definition.

As shown in FIG. 1 in decision 101, the mobile device may detect any user interaction with the mobile device. In various embodiments, this may be accomplished by detecting mobile device movement [e.g. via an accelerometer, global positioning system (GPS), etc.], and/or any mobile device interaction (e.g. via a touchscreen in the form of an option selection, selection of a mute mechanical switch/button, etc.). In such case, audible instructions are outputted by the mobile device per step 103. Specifically, in one embodiment, such audible instructions may be outputted to identify the mobile device as being lost, and further instruct a user in accessing and/or utilizing at least one return option for returning the mobile device to the owner of the mobile device, in a manner that will now be described. It should be noted that step 103 is optional in nature, and embodiments are contemplated where such step is omitted.

With continuing reference to FIG. 1, a graphical user interface element is displayed in step 102, utilizing a display (e.g. screen, touchscreen, etc.) of the mobile device. In the present description, such graphical user interface element may include any portion of a graphical user interface. For example, in various embodiments, the graphical user interface element may include, be part of, and/or be displayed in connection with an icon, window, drop-down list, menu, toolbar, tab, label, tooltip, text and/or graphic, indicia, application button, and/or any other type of control.

It should be noted that the graphical user interface element may be displayed in any context. For example, in one embodiment, the graphical user interface element may be displayed via a lock screen of the mobile device. In one embodiment, such lock screen may include an interface of the mobile device that restricts access to one or more (or all) of the capabilities of the mobile device until an authentication procedure (e.g. password/code entry, gesture entry, etc.) is completed. Further, as an option, access to such graphical user interface element may be permitted while the lock screen of the mobile device is active (and, thus, while the aforementioned capabilities of the mobile device are not permitted). As still another option, the aforementioned audible instructions (of step 103) may use any desired language to verbally instruct the user to select the graphical user interface element for accessing the next step.

In step 104, user input is detected in connection with the graphical user interface element, utilizing an input device of the mobile device. In various embodiments, such input device may include a touchscreen, mechanical button or switch, microphone, camera, and/or any other input device capable of detecting input from the user. More information regarding exemplary input devices will be set forth later during the description of subsequent embodiments. To this end, the user input may also take any form including, but not limited to a touch or any other exertion of force, a vocal input, exposing a face to a camera, and/or any other user input.

In step 106 and in response to the detection of the user input in connection with the graphical user interface element utilizing the input device of the mobile device (e.g. a user touches the interface element, etc.), an interface is displayed including at least one return option for returning the mobile device to an owner of the mobile device, utilizing the display of the mobile device. In the context of the present description, the aforementioned interface may be presented on any portion (or all) of the mobile device display, and the at least one return option may include any information, another graphical user interface element, and/or any other feature that enables, results in, and/or at least facilitates the mobile device being returned to the owner. It should also be noted that, in the present description, the mobile device owner may be any person(s) and/or entity (e.g. corporation, organization, etc.) that has any ownership interest in the device including, but not limited to title, a use contract, simple possession, etc.

For example, in various embodiments that will be elaborated upon later, the at least one return option for returning the mobile device to the owner of the mobile device may include: a communication option for communicating with the owner, a pickup option for arranging the mobile device to be picked up by the owner, a contact option for providing contact information to the owner, a mail option for returning the mobile device to the owner by mail, and/or a surrender option for surrendering the mobile device to a public authority. The aforementioned audible instructions (of step 103) may use any desired language to verbally instruct the user as to how to use one or more of the foregoing options.

To this end, in some optional embodiments, one or more of the foregoing features may facilitate the return of a lost mobile device. Such features may be particularly helpful when conventional device locating systems that rely on mobile device communication capabilities fail (e.g. due to a lack of mobile device power, a lack of cellular service, etc.), or exhibit insufficient locating precision. Further, even if communication is intact and locating precision sufficient, the aforementioned features may be particularly beneficial in situations involving long distance travel (e.g. international travel, etc.) where, even if the owner knows the location of the mobile device, there is no reasonable way of retrieving it. In such case, the mobile device may be more easily located by third parties and be further equipped with features to enable/facilitate the return of the device to the owner by such third parties. This may, in turn, result in significant cost savings (by avoiding a need to replace the mobile device) as well as convenience that would otherwise be foregone in systems that lack such capabilities. It should be noted that the aforementioned potential advantages are set forth for illustrative purposes only and should not be construed as limiting in any manner.

More illustrative information will now be set forth regarding various optional architectures and uses in which the foregoing method may or may not be implemented, as desired. For example, during reference to FIG. 2, exemplary graphical user interface elements and an interface with the return option(s) for returning the mobile device (hereinafter "options interface") will be described. Further, in various other embodiments (described during reference to FIG. 3), the options interface may be displayed in a particular mode of operation that may be triggered under various circumstances (in addition to the selection of a graphical user interface element, as described above). Still yet, additional features that may supplement the display of the options interface will be set forth during reference to FIG. 4. Again, it should be noted that the following information is set forth for illustrative purposes and should not be construed as limiting in any manner. Any of the following features may be optionally incorporated.

Figure 2:
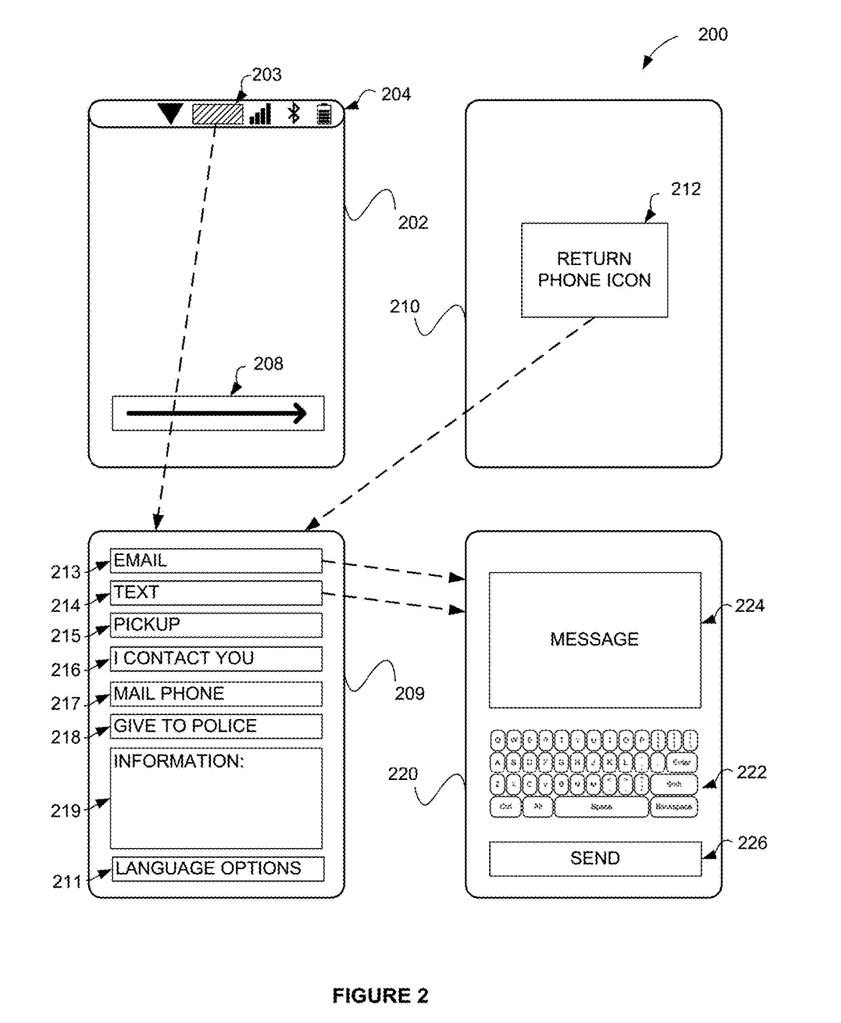
FIG. 2 illustrates various interfaces for facilitating a return of a mobile device to an owner, in accordance with one embodiment.

FIG. 2 illustrates various interfaces 200 for facilitating a return of a mobile device to an owner, in accordance with one embodiment. As an option, the interfaces 200 may be implemented in the context of any one or more of the embodiments set forth in any previous and/or subsequent figure(s) and/or description thereof. However, it is to be appreciated that the interfaces 200 may be implemented in the context of any desired environment.

As shown, two different interfaces 202 and 210 are illustrated which may be used to access an options interface 209 that displays a plurality of return options for returning the mobile device to the owner. Further shown is a communication interface 220 that may be displayed as a result of a selection of a corresponding one or more of the return options of the options interface 209. More information will now be set forth regarding each of the various interfaces 202, 209, 210, and 220.

Specifically, the first exemplary interface 202 includes a graphical user interface element in the form of a return options icon 203 that is displayed on a top status bar 204 of the interface 202, along with a plurality of other status indicators including a cellular status indicator, a BLUETOOTH status indicator, a battery level status indicator, etc. Other features of the interface 202 may include a swipe gesture control 208 for accessing the mobile device and possibly presenting a code entry screen (not shown). In use, a user input (e.g. a touch) in connection with the return options icon 203 results in a display of the options interface 209 for displaying the return options for returning the mobile device to the owner.

The second exemplary interface 210 includes a graphical user interface element in the form of a more prominently presented button 212. The button 212 can include "return phone" text that advertises the purpose of the button 212. Similar to the previous embodiment, a user input (e.g. a touch) in connection with the button 212 results in a display of the options interface 209 for displaying the return options for returning the mobile device to the owner. In various embodiments (to be described during reference to FIG. 4), the interface 210 with the button 212 may be displayed in a particular mode of operation, namely a return mobile device mode (hereinafter "return phone mode"), that may be triggered under certain conditions.

The options interface 209 comprises a graphical user interface (GUI) that presents input options for returning the mobile device. The options interface 209 presents one or more input options for further displays/actions, where the input options comprise buttons or other selectable input features. The input options can be selected to trigger further displays/actions. The options interface 209 may supplant a wallpaper picture of the mobile device when activated. The options interface 209 in some embodiments includes a first option 213 and a second option 214 for communicating with the owner via an e-mail protocol and a short messaging service (SMS) protocol, respectively. The options interface 209 further includes a third option 215 for arranging the mobile device to be picked up by the owner. In response to detection of user input in connection with (e.g. selection of, etc.) the third option 215, another interface (not shown) may be provided (or the options interface 209 may be expanded/adjusted) for allowing entry of a physical address (and possibly a pick-up time) that is communicated to a predetermined destination (e.g. email destination address, SMS destination address, etc.) associated with the owner and/or a third party service. By this design, the mobile device may be picked up at such address by the owner, or by the third party service (which would then forward the mobile device to the owner).

The options interface 209 may also include a fourth option 216 for providing contact information to the owner. In response to detection of user input in connection with (e.g. selection of, etc.) the fourth option 216, another interface (not shown) may be provided (or the options interface 209 may be expanded/adjusted) for allowing entry of an e-mail address, phone number, or voice message that is communicated to a predetermined destination (e.g. email destination address, SMS destination address, etc.) associated with the owner. To this end, the owner may establish communication with a person who has located the owner's mobile device, so that such parties may coordinate the return of the mobile device to the owner.

Still yet, the options interface 209 may also include a fifth option 217 for returning the mobile device to the owner by mail. In response to detection of user input in connection with (e.g. selection of, etc.) the fifth option 217, another interface (not shown) may be provided (or the options interface 209 may be expanded/adjusted) for displaying a mailing address and possibly delivery instructions (e.g. a delivery service account number, payment reimbursement instructions, etc.) for enabling a person who has located the owner's mobile device to return the mobile device to the owner by mail and possibly be reimbursed by the owner, or a mobile phone seller/re-seller.

With continuing reference to FIG. 2, the options interface 209 may also include a sixth option 218 for surrendering the mobile device to a public authority. In response to detection of user input in connection with (e.g. selection of, etc.) the sixth option 218, another interface (not shown) may be provided (or the options interface 209 may be expanded/adjusted) for displaying an address (e.g. to a closest police/fire station that is looked-up via the Internet, etc.) for enabling a person who has located the owner's mobile device to surrender the mobile device to an authority which, in turn, will return the mobile device to the owner.

As additional possibilities, the options interface 209 may also include input option information 219 for facilitating the return of the mobile device to the owner. Such input option information 219 may include, but is not limited to general information about the owner, a general explanation of the options interface 209 and the input options, reward information, etc. While the input option information 219 is shown to be positioned on a lower portion of the options interface 209, it may, in other embodiments, be displayed at any other location of the options interface 209. Further, in still other embodiments, such input option information 219 may be audibly conveyed when the options interface 209 is first displayed (and, optionally, can be subsequently repeated on a periodic or non-periodic basis, etc.). Still yet, in one possible embodiment, selection of any return option may be followed by audible instructions describing how such return option may be used correctly.

It should be noted that one or more of the foregoing return options may not necessarily work if the mobile device does not have access to a network service. In such embodiment, only those return options that are capable of functioning (e.g. the fifth option 217, sixth option 218, etc.) may be provided, based on the presence of such network service. Further, the return options may be dynamically updated based on such network service presence.

Still yet, a language option 211 may be provided for enabling a person who has located the owner's mobile device to change a language in which the options interface 209 is displayed. In one embodiment, the options interface 209 may be displayed in a default language (e.g. English, etc.) as well as another language (e.g. side-by-side, etc.), where such other language is selected based on a current location of the mobile device. In another embodiment, the language option 211 may not necessarily be displayed under certain conditions (e.g. when the mobile device is in the country of origin, etc.).

In use, a message may be sent to the owner, utilizing a communication interface 220 and a network interface of the mobile device. As mentioned earlier, the options interface 209 in some embodiments includes the first option 213 and the second option 214 for communicating with the owner via an e-mail protocol and a SMS protocol, respectively. In response to detection of user input in connection with (e.g. selection of, etc.) the first option 213 and/or the second option 214, the communication interface 220 is displayed. The communication interface 220 is used for sending and/or receiving messages. Specifically, the communication interface 220 includes a virtual keyboard 222, a message display portion 224, and a send icon 226. The message display portion 224 can display a message received by the mobile device. The message display portion 224 can also display a message being created on or previously stored in the mobile device. The virtual keyboard 222 can be used to create such message on the mobile device by receiving keyboard inputs that are entered (e.g. typed, etc.) by a finder of the mobile device. The virtual keyboard 222 can also be used in reviewing a message received by the mobile device (e.g. by selecting one or more messages to review, etc.). The send icon 226 can be used to send a message from the mobile device, including a message created on the mobile device using the virtual keyboard 222 and displayed on the message display portion 224. The send icon 226 can also be used to reply to received messages, wherein a reply message can be created on the mobile device using the virtual keyboard 222 and displayed on the message display portion 224.

To accomplish this in accordance with one possible embodiment, a designated email address may, for example, be registered with the mobile device during set up or thereafter during use. Such email address may be accessible via any other device (e.g. computer, another mobile device, etc.) by the owner logging into an associated email account. Further, the mobile device may also have access to such same email account. To this end, the messages between the mobile device and the other device (via the communication interface 220) may be administered via a single email account by sending messages to the same address (that is accessible by both devices). In other embodiments, e-mail or other communications may involve more than one destination address.

As shown, the communication interface 220 may optionally conceal an identity of the owner. In other words, a destination address (e.g. e-mail or SMS address, etc.) may not be shown or otherwise made accessible to the person who has located the owner's mobile device. Further, the message display portion 224 may further serve to display any response sent from the owner to the mobile device, in response to a message sent by the finder and using the mobile device, for example.

Figure 3:
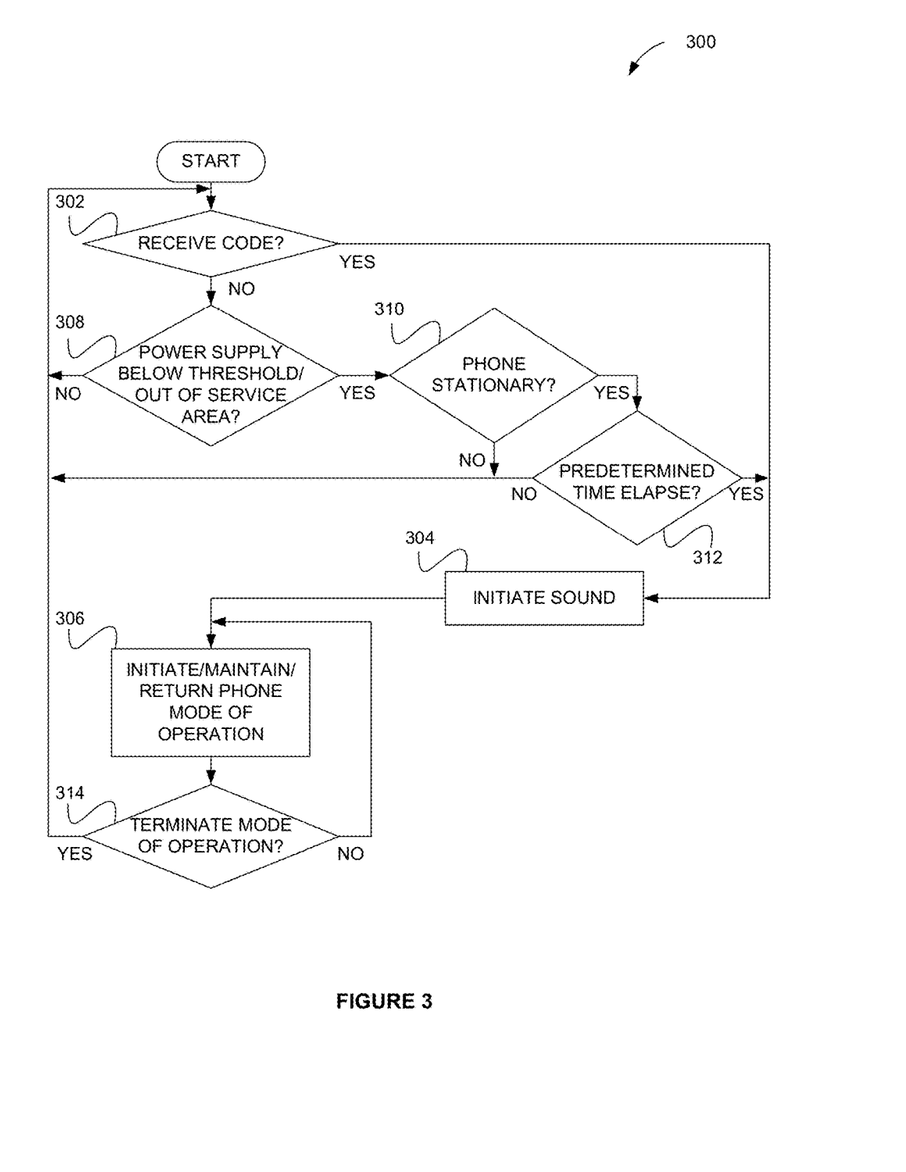
FIG. 3 is a flowchart of a method for triggering a return phone mode of operation, in accordance with one embodiment.

FIG. 3 is a flowchart 300 of a method for triggering a return phone mode of operation, in accordance with one embodiment. Such method may be implemented in the context of any one or more of the embodiments set forth in any previous and/or subsequent figure(s) and/or description thereof. For example, in one embodiment, the method may afford additional avenues to display return options for returning a lost mobile device (e.g. see step 106 of FIG. 1, the options interface 209 of FIG. 2, etc.). However, it is to be appreciated that the method may be implemented in the context of any desired environment.

As shown, the method checks for a code being received in decision 302. If a code has been received, the method proceeds to step 304. Otherwise, the method branches to step 308. In one embodiment, such code may be received over a network. Further, the code may include a textual code predefined by the owner (e.g. during a registration process before the mobile phone was lost). Thus, in one possible embodiment that utilizes a SMS protocol, an owner may trigger decision 302 by entering a code on any other device (e.g. phone, computer, etc.) and direct such code to the lost mobile device. In other embodiments, the code may be delivered via any other communication protocol, and even via a phone call and/or voice message (in which case the code is identified using sound recognition or any other technique, etc.).

In response to the receipt of such code, the mobile device is configured to emit a sound (and/or produce any other perceptible visual/tactile output, etc.) per step 304. In one embodiment, this may serve to draw the attention of third parties within a vicinity of the mobile device. To accomplish this, the sound may include a siren, an intermittent sound, and/or any other sound, for that matter. Optionally, the display and/or a flashlight of the mobile device may flash or otherwise provide light to further bring attention to the device (particularly in the absence of ambient light). In still another embodiment, the sound may include a person speaking, and such sound may optimally be delivered in a language that is selected based on a location of the mobile device. In such embodiment, a script may be used to instruct third parties to locate the phone and return it the owner. In some embodiments, step 304 includes more than one of the above notifications.

Further, in step 306, a return phone mode of operation is initiated. Among other things, the return phone mode of operation may include the display of an options interface (e.g. the options interface 209 of FIG. 2, etc.) for displaying return options for returning the mobile device to the owner. As will become apparent during the description of at least one subsequent embodiment shown in FIG. 4, the return phone mode may also involve additional features for facilitating a return of the mobile device to the owner.

As shown in FIG. 3, there may be other ways of triggering the return phone mode of operation. For example, it may be determined whether at least one of a plurality of conditions is met in connection with the mobile device. Further, such conditions may include, but are not limited to a power level of the mobile device, a movement of the mobile device, a lapse of a predetermined amount of time, and/or a cellular service status, etc.

Specifically, as indicated in decision 308, a power level in the mobile device is monitored to determine whether such power level drops below a predetermined minimum power threshold. In various embodiments, such predetermined minimum power threshold may include any percentage of the power level (e.g. 20%, 15%, 10%, 5%, etc.), and the monitoring of such power level may be accomplished utilizing a software-based power monitor that is otherwise used to display a power level status indicator (e.g. battery level status indicator, etc.). If such occurs, it is then determined whether the phone remains stationary per decision 310, for a predetermined amount of time per decision 312. In one embodiment, such decisions 310, 312 may be carried out utilizing an accelerometer and a software timer administered by a processor of the mobile device, respectively. More information regarding such exemplary mobile device components will be set forth later during the description of subsequent embodiments.

By this design, the return phone mode of operation may be triggered when there are indications that the owner no longer possesses their phone (i.e. it no longer moves for a certain duration), and the mobile device is nearing a time when nothing can be done to facilitate return of the mobile device to the owner, due to the power supply expiring, etc. Further, in other embodiments, the mobile device may be configured such that the return phone mode of operation may persist despite the mobile device being: in a lock screen mode, damaged, having a SIM card replaced, and/or being outside a cellular service area, in which case a WiFi network may be used, or return phone mode features requiring communication may be disabled (while other features are still operational).

While multiple different avenues have been described to enter the return phone mode of operation, it should be noted that others may be used to supplement the foregoing method of FIG. 3. Further, once the return phone mode has been triggered, it may be terminated in a variety of ways per decision 314.

For example, the return phone mode of operation may, in one embodiment, be terminated manually. Specifically, in one particular embodiment, the return phone mode may be terminated by the person who has located the owner's mobile device, by selecting a particular graphical user interface element, possibly entering a predetermined passcode provided by the owner via a communications interface (e.g. interface 220 of FIG. 2, etc.), etc. In another embodiment, the return phone mode may be terminated by the mobile device owner, by sending another code (or the same code received in connection with decision 302) to the mobile device, once the owner is satisfied that the process of returning the mobile device has sufficiently commenced.

In still yet another embodiment, the return phone mode may be terminated automatically. For example, the return phone mode may terminate after a predetermined amount of time. It should be noted that, in each of the foregoing embodiments, the termination of the return phone mode may be complete or partial in nature. In other words, in some embodiments, certain features (e.g. the sound emission of step 304, etc.) may persist (at least periodically) while other features cease. Further, any iteration of any of the steps of FIG. 3 may incorporate a predetermined or user-configured delay between each iteration to save battery power. More information will now be set forth regarding one possible method for operating the mobile device in a return phone mode.

Figure 4:
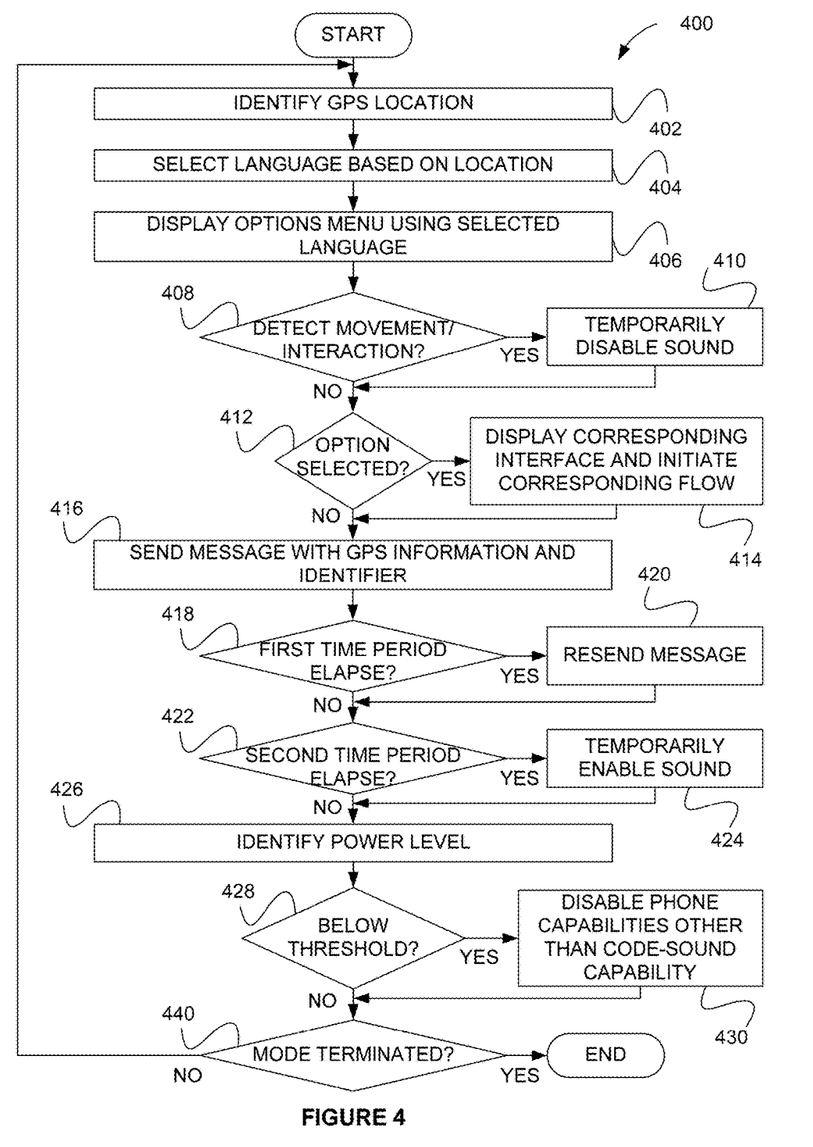
FIG. 4 is a flowchart of a method for operating a mobile device in a return phone mode, in accordance with one embodiment.

FIG. 4 is a flowchart 400 of a method for operating a mobile device in a return phone mode, in accordance with one embodiment. Optionally, the method may be implemented in the context of any one or more of the embodiments set forth in any previous and/or subsequent figure(s) and/or description thereof. For example, in one embodiment, the method may be initiated by step 306 of FIG. 3. However, it is to be appreciated that the method may be implemented in the context of any desired environment.

As shown, in step 402, a location of the mobile device is identified, utilizing a global positioning system (GPS) of the mobile device, for example. Further, at least one language is selected in step 404, based on the location. Thus, an options interface (e.g. options interface 209 of FIG. 2, etc.) may be displayed in step 406. Further, the return options displayed by such options interface may be presented in the selected language. In other embodiments, the return options displayed by the options interface may be presented in more than one language (e.g. a default language, as well as the dynamically selected language), as mentioned earlier. Still yet, the language may be updated periodically and/or in response to a movement of the mobile device to another region of the world.

Further, after the display of the options interface in step 406, in decision 408 the mobile device may detect any movement (e.g. via an accelerometer, GPS, etc.), and/or any interaction (e.g. via the touchscreen in the form of return option selection, selection of a mute button, receipt of another code similar to that is identified via decision 302 of FIG. 3, etc.). If motion or interaction is detected, the method proceeds to step 410. Otherwise, the method proceeds to decision 412. In such case, the sound may be at least temporarily disabled per step 410. By this design, the sound (whose purpose was to attract attention) may be disabled to avoid annoying third parties after the aforementioned purpose has been served.

With continuing reference to FIG. 4, the mobile device checks whether any one or more return options of the options interface has been selected, per decision 412. If so, a corresponding interface (associated with the selected return option) may be displayed to facilitate the particular return option of returning the mobile device to the user. See step 414. As mentioned earlier, the various return options that are monitored for selection may involve a communication option for communicating with the owner, a pickup option for arranging the mobile device to be picked up by the owner, a contact option for providing contact information to the owner, a mail option for returning the mobile device to the owner by mail, and/or a surrender option for surrendering the mobile device to a public authority In any case, a message is sent to the owner in operation 416 in connection with (e.g. before, during, after, etc.) the interface being displayed (per step 406), utilizing a network interface of the mobile device. In various embodiments, the message may be sent using any desired SMS or e-mail communication protocol that allows the owner to receive the same without use of the mobile device (e.g. using another device of the owner or a third party, etc.). Further, such message may be automatically sent without necessarily requiring such message being prompted/initiated by the person who has located the owner's mobile device, or even without necessarily being prompted/initiated by the owner.

Optionally, a location of the mobile device may be identified, utilizing a GPS of the mobile device, so that such location may be included with the message (e.g. in the form of coordinates, an address, a map, directions to the device, etc.). Optionally, the message may include an identifier associated with the mobile device. In various embodiments, such identifier may include a serial number of the mobile device, a phone number registered with the mobile device, and/or any other unique or pseudo-unique identifier. By this design, the owner may be provided with a notice that the mobile device has entered the return phone mode of operation, an indication of which device is the subject of the message, and the current location.

As indicated by decision 418, the message sent in step 416 may be resent in step 420 after the lapse of a first time period. By this feature, the owner may be updated as to the location of the mobile device during the return process. Similarly, as indicated by decision 422, the sound may be at least temporarily enabled in step 424 after the lapse of a second time period. Such feature may serve as a reminder, in the absence of the return process being initiated or complete, to return the device to the owner. In various embodiments, the first and/or second time periods may be predetermined and/or owner-selected.

To ensure that the mobile device has sufficient power to operate in the return phone mode of operation (and of a sufficient duration), a power level of the mobile device may be detected per step 426. Further, it may be determined in decision 428 whether the power level of the mobile device falls below a predetermined minimum power threshold. As mentioned earlier, this may be accomplished utilizing a software power monitor that is otherwise used to display a power level status indicator (e.g. battery level status indicator, etc.).

If it is determined that the power level of the mobile device falls below the predetermined minimum power threshold per decision 428, use of the power supply of the mobile device may be restricted in step 430 to facilitate allocating power to the various operations 402-424 of FIG. 4. Such restrictions may include restricting or ceasing all other capabilities of the mobile device or, in other embodiments, may restrict only the most power-consuming capabilities (e.g. background task processes, modem usage, etc.). Optionally, if it is determined that the power level of the mobile device falls below the predetermined minimum power threshold per decision 428, an auxiliary power source (to be described later) may be utilized for allocating power to the various operations 402-424 of FIG. 4. In such embodiment, such auxiliary power source may include a separate battery within the mobile device (possibly of a smaller size/capacity as compared to a primary mobile device battery). Further, in still yet another possible embodiment, the method may loop with less frequency if the power supply falls below the predetermined minimum power threshold per decision 428.

Further, while the method is active, other features (e.g. email application, messaging application, contacts application, etc.) may be disabled and/or restricted such that the person who locates the owner's device is unable to gain access to any sensitive/personal information of the owner and, instead, is just given access to device capabilities and/or information that are necessary to facilitate a return of the mobile device to the owner.

To this end, the method continues, in the manner shown, until the return phone mode has been terminated per decision 440. In one embodiment, the decision 440 may be similar (or hinge upon) operation 314 of FIG. 3.

Figure 5:
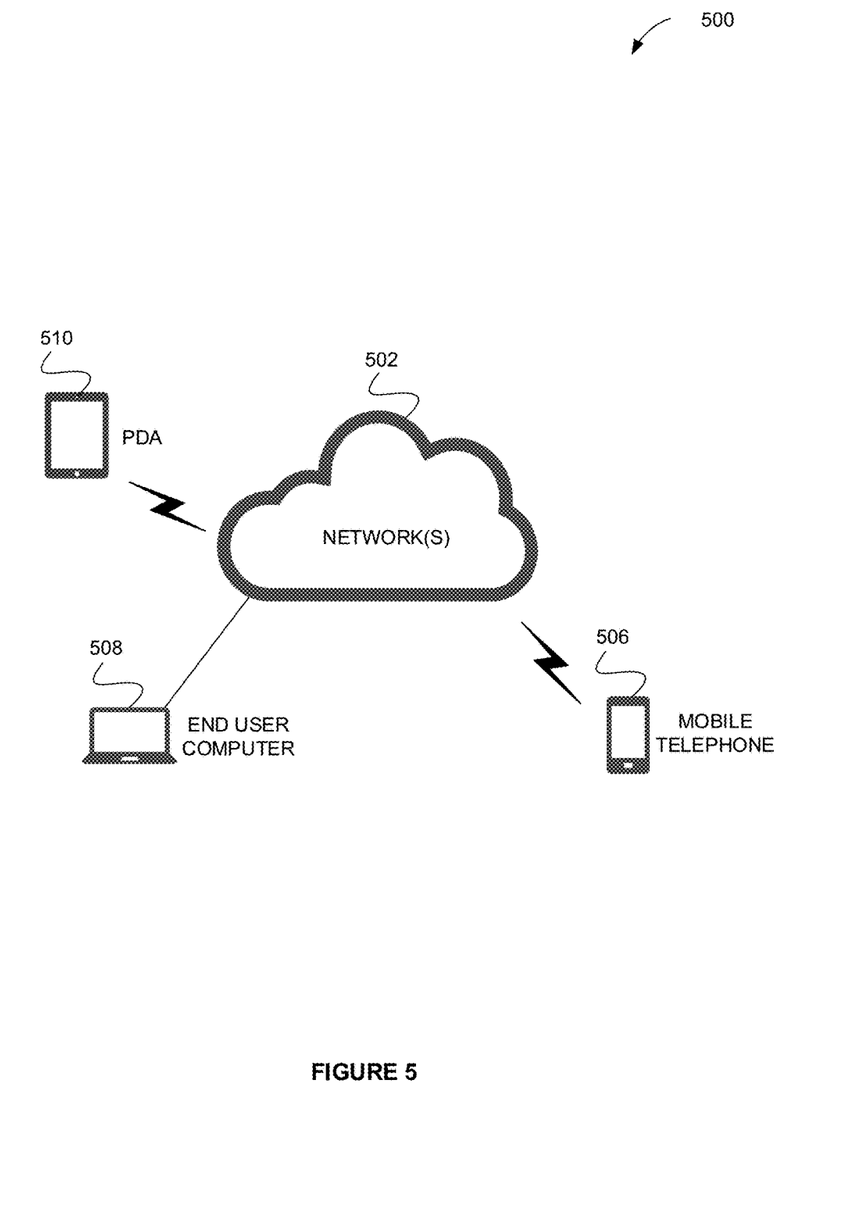
FIG. 5 illustrates a network architecture including various mobile devices, in accordance with one embodiment.

FIG. 5 illustrates a network architecture 500 including various mobile devices, in accordance with one embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of mobile devices. For example, a computer 508 may be coupled to the network 502 for communication purposes. Such computer 508 may include a lap-top computer, a notebook computer, and/or any other type of mobile computer. Still yet, various other devices may be coupled to the network 502 including a personal digital assistant (PDA) device 510, a mobile phone device 506, etc.

In various embodiments, any one or more components/features set forth during the description of any previous figure(s) may be implemented in connection with any one or more of the mobile devices of the at least one network 502. For example, the mobile phone device 506 may be equipped with the disclosed features configured for facilitating its return in the event that such mobile phone device 506 is lost. Further, any interaction with the mobile phone device 506 may be accomplished using any of the other devices (e.g. the PDA device 510, computer 508, etc.).

Figure 6:
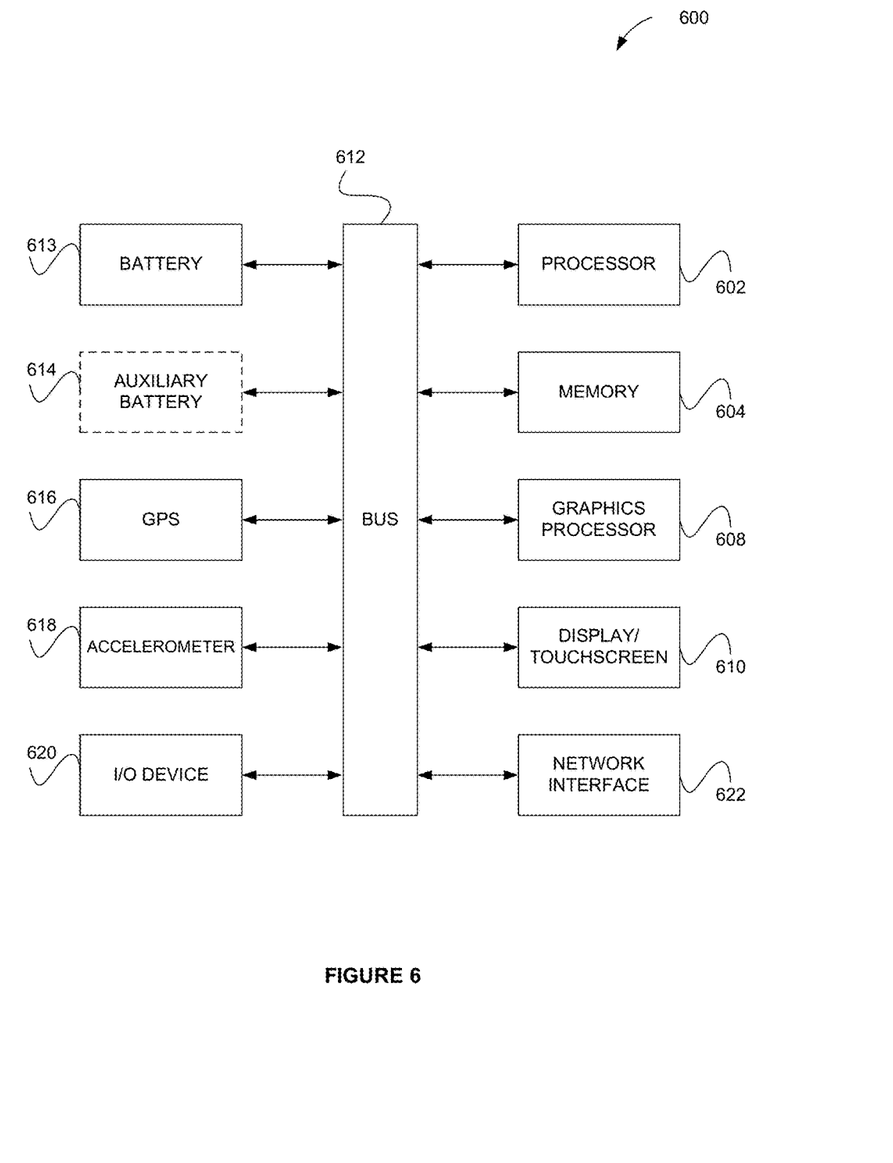
FIG. 6 is a diagram of an exemplary mobile device system, in accordance with one embodiment.

FIG. 6 is a diagram of an exemplary mobile device 600, in accordance with one embodiment. Optionally, the mobile device 600 may be implemented in the context of any of the devices of the network architecture 500 of FIG. 5. However, it is to be appreciated that the mobile device 600 may be implemented in any desired environment.

As shown, a mobile device 600 is provided including at least one processor 602 which is connected to a bus 612. The mobile device 600 also includes memory 604 [e.g., solid state drive, random access memory (RAM), etc.]. The mobile device 600 may also include a graphics processor 608 and a display 610 in the form of a touchscreen or the like in some embodiments.

Also included is a battery 613 (i.e., a primary power supply) for providing the components with power during use. Strictly optionally, such battery 613 may or may not be supplemented with an auxiliary battery 614. As mentioned earlier, such auxiliary battery 614 may be of a lesser size and/or capacity, as compared to the battery 613.

The mobile device 600 may include a GPS 616 for providing location information in connection with the mobile device 600 in some embodiments. An accelerometer 618 may be provided for providing movement information in connection with the mobile device 600 in some embodiments. At least one I/O device 620 is provided. The I/O device 620 can include various input and/or output devices. In various embodiments, such I/O device 620 may include an auditory output device (e.g. speaker, etc.), a tactile output device (e.g. vibrator mechanism, etc.), a visual output device (e.g. a flashlight, etc.), and/or any other output device capable of emitting perceptible output. The I/O device 620 can include a keyboard, keypad, buttons, microphone, camera, or other suitable input devices. Still yet, the I/O device 620 may include a touchscreen in some embodiments. In various embodiments, the I/O device 620 may be communicatively coupled to the bus 612 via hardwiring, and/or the I/O device 620 may communicate with the other components via a wireless connection. Also shown communicatively coupled to the bus is a network interface 622 (e.g. modem, etc.) for communicating with one or more networks (e.g. the network 502 of FIG. 5, etc.) via one or more communication protocols (e.g. cellular, WiFi, BLUETOOTH, etc.).

Computer programs, or computer control logic algorithms, may be stored in the memory 604 and/or any other memory, for that matter. Such computer programs, when executed, enable the mobile device 600 to perform various functions (as set forth above, for example). Memory 604 and/or any other storage are possible examples of non-transitory computer-readable media.

In some embodiments, the processor 602 executes software stored in the memory 604 to display a graphical user interface element utilizing a display of the mobile device, detect user input in connection with the graphical user interface element, utilizing an input device of the mobile device, and display an interface including at least one return option for returning the mobile device to an owner of the mobile device, utilizing the display of the mobile device, in response to the detection of the user input in connection with the graphical user interface element utilizing the input device of the mobile device.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method implemented by a mobile device, the method comprising:
    determining that a first power level of the mobile device is below a first threshold and that the mobile device is stationary;
    based on the determining:
        displaying a graphical user interface (GUI) on a display device of the mobile device wherein the GUI provides a first return option for returning the mobile device to an owner of the mobile device; and
        sending a message to the owner of the mobile device.

2. The method of claim 1, wherein the GUI is displayed on a lock screen of the mobile device.

3. The method of claim 1, further comprising:
    receiving a code from a network interface of the mobile device; and
    emitting a sound based on the receipt of the code.

4. The method of claim 1 wherein displaying the GUI comprises displaying the GUI based on determining that a first time period has elapsed.

5. The method of claim 1, further comprising:
    identifying a location of the mobile device.

6. The method of claim 5, further comprising:
    selecting a language based on the identified location; and
    wherein displaying the GUI comprises providing the first return option in the selected language.

7. The method of claim 5 wherein the message comprises the location of the mobile device.

8. The method of claim 1, further comprising:
    detecting user selection of the first return option and based on the detecting:
        displaying a communication interface;
        receiving user input to the communication interface; and
        wherein sending the message to the owner of the mobile device comprises sending the user input to the owner of the mobile device.

9. The method of claim 1, further comprising:
    detecting a second power level of the mobile device; and
    determining that the second power level of the mobile device is below a second threshold and, based thereon, restricting one or more power-consuming activities of the mobile device.

10. The method of claim 1, further comprising:
    detecting user interaction with the mobile device and, based thereon, outputting audible instructions.

11. A mobile device comprising:
    a display;
    a memory comprising instructions; and
    a processor in communication with the display and the memory wherein the processor executes the instructions to:
    determine that a first power level of the mobile device is below a first threshold and that the mobile device is stationary;
    based on the determining:
        display a graphical user interface (GUI) on a display device of the mobile device wherein the GUI provides a first return option for returning the mobile device to an owner of the mobile device; and
        send a message to the owner of the mobile device.

12. The mobile device of claim 11, wherein the GUI is displayed on a lock screen of the mobile device.

13. The mobile device of claim 11 wherein the processor executes the instructions to:
    receive a code from a network interface of the mobile device; and
    emit a sound based on the receipt of the code.

14. The mobile device of claim 11 wherein displaying the GUI comprises displaying the GUI based on determining that a first time period has elapsed.

15. The mobile device of claim 11 wherein the processor executes the instructions to:
    identify a location of the mobile device.

16. The mobile device of claim 15 wherein the processor executes the instructions to:
    select a language based on the identified location; and wherein displaying the GUI comprises providing the first return option in the selected language.

17. The mobile device of claim 15 wherein the message comprises the location of the mobile device.

18. The mobile device of claim 11 wherein the processor executes the instructions to:
  detect user selection of the first return option and based on the detecting:
    display a communication interface;
    receive user input to the communication interface; and
    wherein sending the message to the owner of the mobile device comprises sending the user input to the owner of the mobile device.

19. The mobile device of claim 11 wherein the processor executes the instructions to:
  detect a second power level of the mobile device; and
  determine that the second power level of the mobile device is below a second threshold and, based thereon, restricting one or more power-consuming activities of the mobile device.

20. The mobile device of claim 11 wherein the processor executes the instructions to:
  detect user interaction with the mobile device and, based thereon, outputting audible instructions.

21. A non-transitory computer-readable medium storing computer instructions, that when executed by one or more processors, cause the one or more processors to perform the steps of:
  determine that a first power level of the mobile device is below a first threshold and that the mobile device is stationary;
  based on the determining:
    display a graphical user interface (GUI) on a display device of the mobile device wherein the GUI provides a first return option for returning the mobile device to an owner of the mobile device; and
    send a message to the owner of the mobile device.

* * * * *